(12) United States Patent
Fang

(10) Patent No.: US 7,194,700 B2
(45) Date of Patent: Mar. 20, 2007

(54) SYSTEM AND METHOD FOR ONE-STROKE MULTIMEDIA PROGRAMMING

(75) Inventor: Henry Hung-Yeh Fang, Cerritos, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 803 days.

(21) Appl. No.: 10/389,182

(22) Filed: Mar. 14, 2003

(65) Prior Publication Data

US 2004/0179142 A1    Sep. 16, 2004

(51) Int. Cl.
*G06F 3/00*  (2006.01)
*G06F 9/00*  (2006.01)
*G06F 17/00* (2006.01)

(52) U.S. Cl. ............... 715/827; 715/847; 715/846; 715/840; 348/734

(58) Field of Classification Search ........... 715/847, 715/827; 348/734
See application file for complete search history.

(56) References Cited

U.S. PATENT DOCUMENTS

| 5,629,733 | A  | * | 5/1997 | Youman et al. ............ 725/53 |
| 6,032,202 | A  |   | 2/2000 | Lea et al. ................... 710/8 |
| 6,038,625 | A  |   | 3/2000 | Ogino et al. ............. 710/104 |
| 6,052,750 | A  |   | 4/2000 | Lea ........................... 710/72 |
| 6,085,236 | A  |   | 7/2000 | Lea ........................... 709/220 |
| 6,229,524 | B1 | * | 5/2001 | Chernock et al. ........ 345/157 |
| 6,396,523 | B1 | * | 5/2002 | Segal et al. .............. 715/863 |
| 6,597,374 | B1 | * | 7/2003 | Baker et al. .............. 715/717 |
| 2004/0155791 | A1 | * | 8/2004 | Nguyen et al. ...... 340/825.69 |

* cited by examiner

*Primary Examiner*—Raymond J. Bayerl
*Assistant Examiner*—Sabrina Greene
(74) *Attorney, Agent, or Firm*—Law Office of Gerald Maliszewski; Gerald Maliszewski

(57) ABSTRACT

Methods are provided for configuring and invoking command sequences from a remote control (RC) keystroke in a multimedia system of networked devices. The configuring method comprises: selecting a multimedia configuration menu; selecting an RC key; selecting a multimedia command to associate with the RC key; selecting a multimedia source associated with the multimedia command; selecting a multimedia destination associated with the multimedia command; in response to associating multimedia commands with RC keys, generating an RC key map cross-referencing RC keys to multimedia commands; and, storing the RC key map in permanent memory.

5 Claims, 12 Drawing Sheets

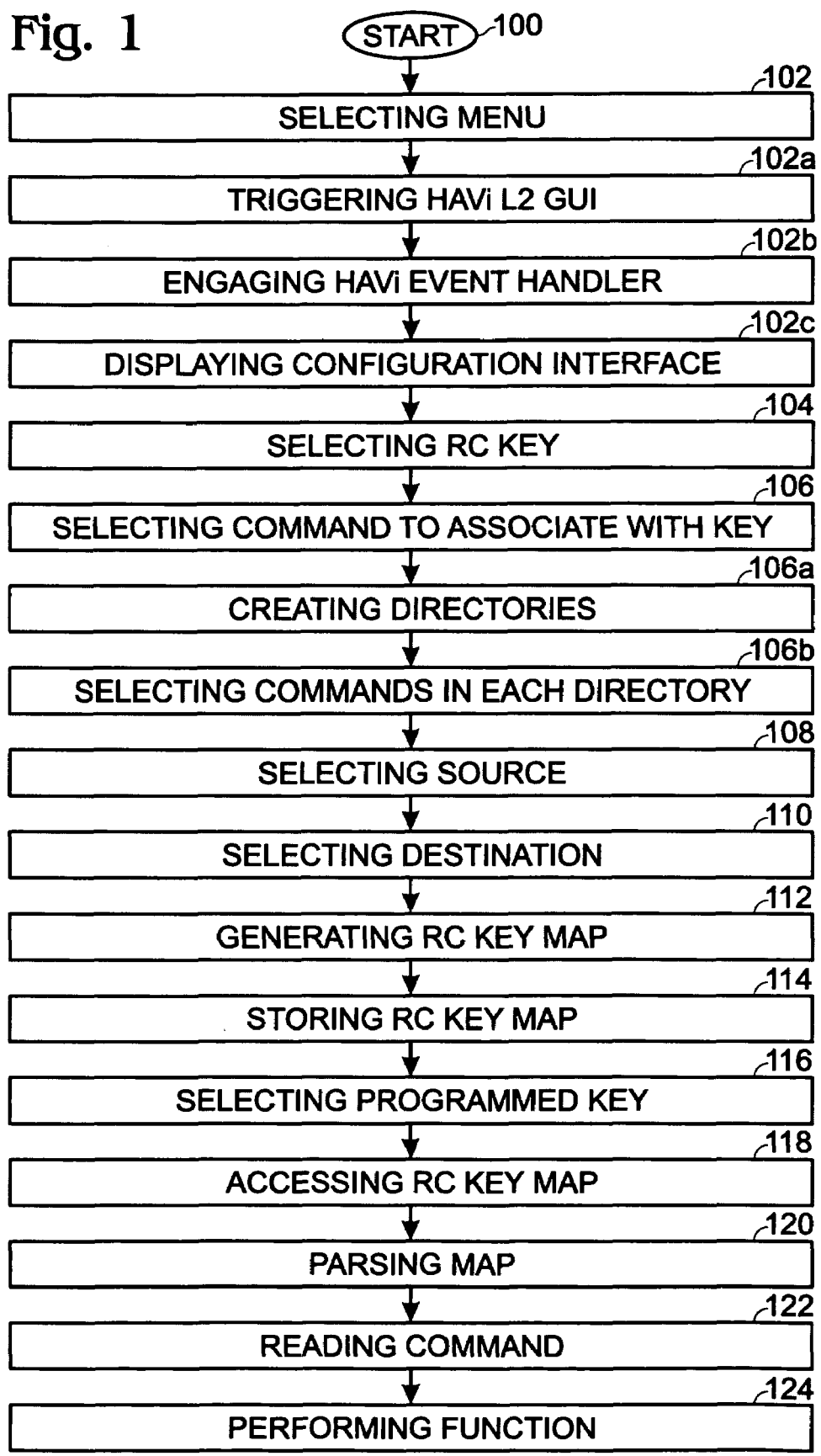

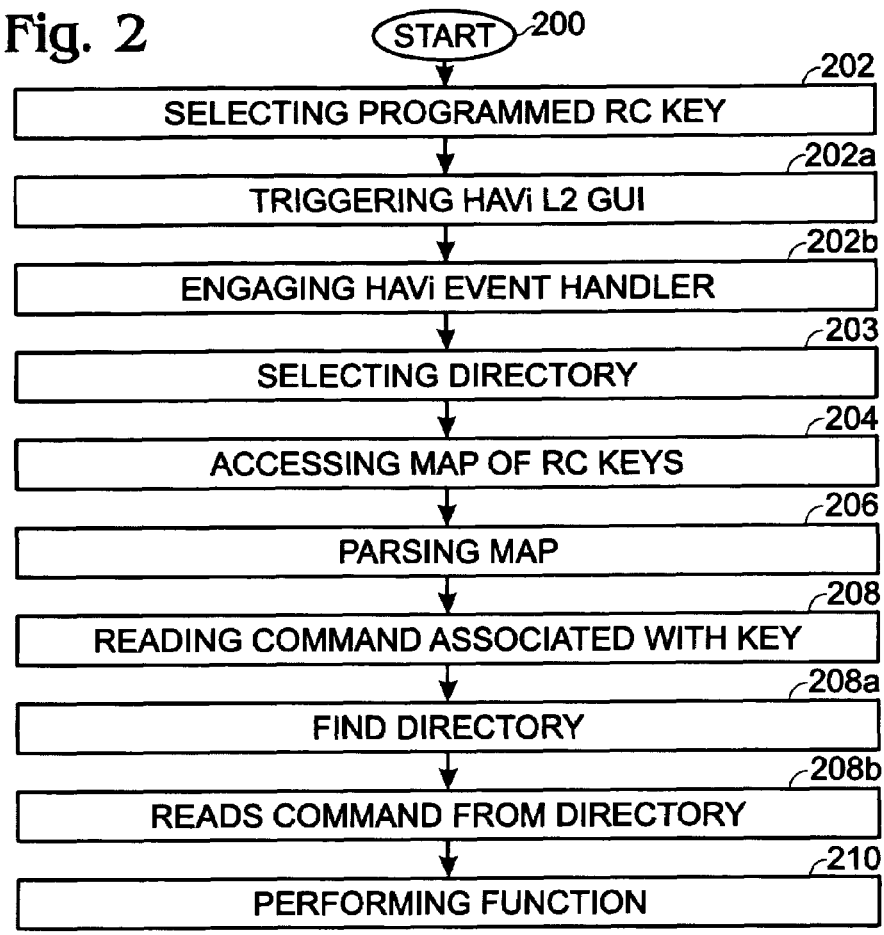
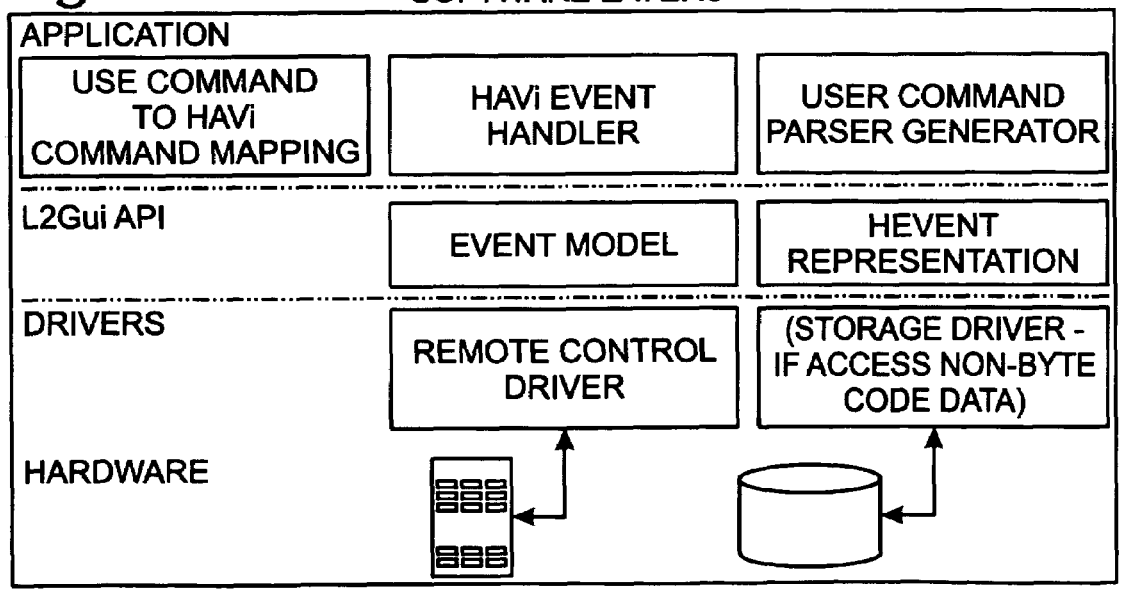

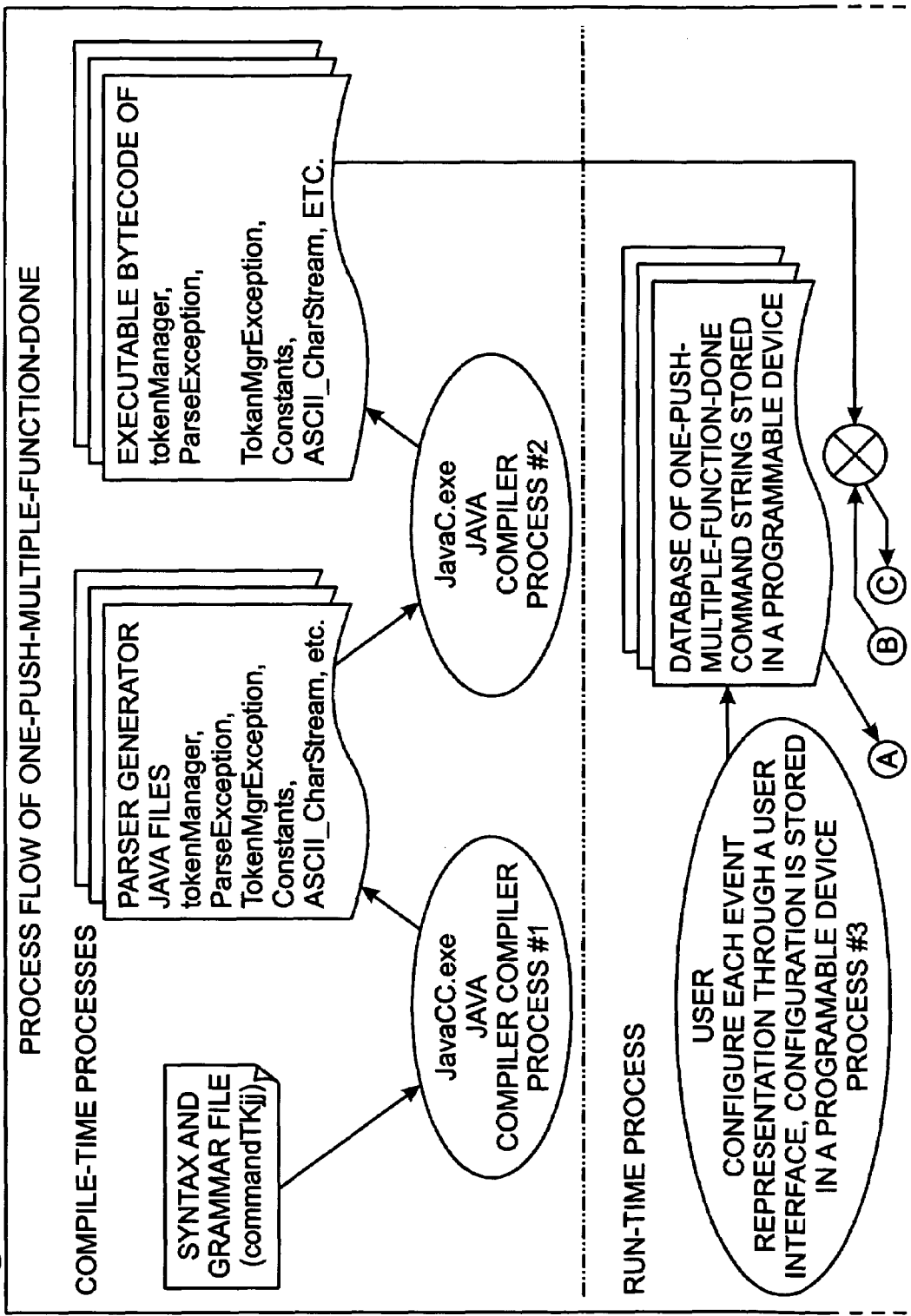

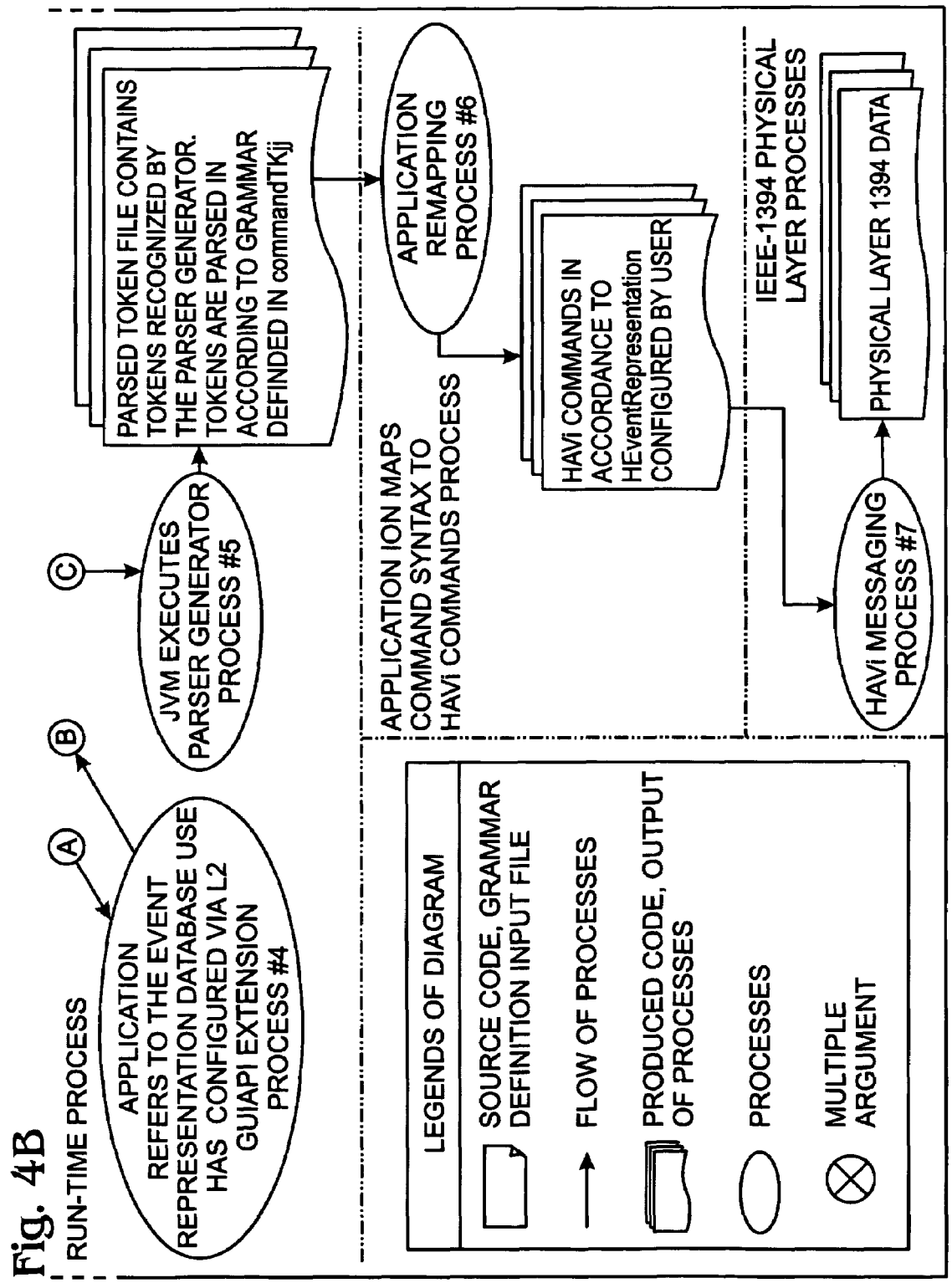

Fig. 11
UI TO SPECIFY KEY TO BE CONFIGURED

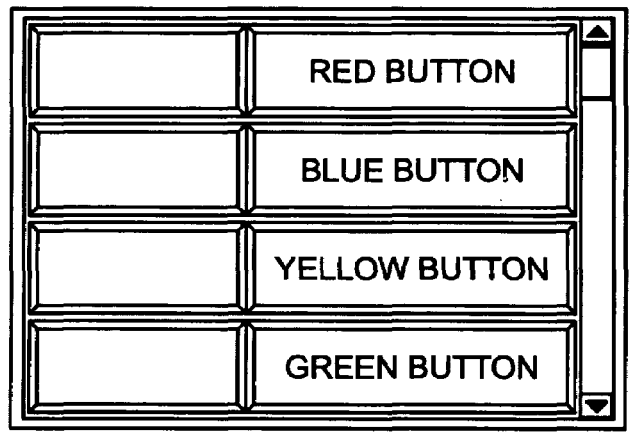

Fig. 5A  GRAMMAR FILE TO DEFINE COMMAND SYNTAX

```
**********************************************************************
* File name: commandTk.jj
* Purpose: This language grammar file is an input to JavaCC,
*   (Java Compiler Compiler), which generates a language
*   parser to recognize the grammar defined in commandTk.jj
*
* Usage:    javaCC   commandTk.jj
*
* Output:  The JavaCC compilation generates the following output files:
*    commandTk.java
*    commandTkTokenManager.java
*    commandTkConstants.java
*    commandTkParseException.java
*    Token.java
*    TokenMgrError.java
*
*    Those output files compose the language parser recognizes
*    programming language tokens defined in "commandTk.jj" grammer
*    file.
*
* Author:   H.Fang
* Last update: 07/10/01
**********************************************************************
```

Fig. 5B

```
options {
  OUTPUT_DIRECTORY="E:\\JavaCC\\OneKey\\output\\commandTk";
}
PARSER_BEGIN(commandTk {
public class commandTk)
   static String[] ARG_STRINGs;
   static boolean startOver;
   static int  cmdC, guidC, stringC;
   static java.util.Stack argStack=new java.until/Stack();
 public static void main(String args[]) throws ParseException {
   commandTk parser=new commandTk(System.in);
   startOver=true;
   cmdC=0; guidC=0; stringC=0;
   System.out.println( "Enter a command, (0-9, a-z, '-, @, .' only): ");
   while( true)}
     try}
       switch { parser.one_command_section() ){
       case-0:
         System.exit(0);
         break;
       case-1:
         System.out.print1ln( "Enter a command, (0-9, a-z, '-, @, .'only): ");
         break;
       default:
         break;
       }
       while (!startOver) { }
   } catch { ParseException pe ) {
     System.out.println( pe.toString() );
     throw pe;
   }
 }
}
PARSER_END(CommandTk)
```

Fig. 6A  GRAMMAR FILE TO DEFINE COMMAND SYNTAX (CONT'D)

```
SKIP: {
  " "
  | "\t"
  | "\n"
  | "\r"
}

TOKEN: {
  <GUID: "0x"<HEXDIGIT><HEXDIGIT><HEXDIGIT><HEXDIGIT><HEXDIGIT><HEXDIGIT><HEXDIGIT><HEXDIGIT> "-"
         <HEXDIGIT><HEXDIGIT><HEXDIGIT><HEXDIGIT><HEXDIGIT><HEXDIGIT><HEXDIGIT><HEXDIGIT> >
  | <#HEXDIGIT: ["0"-"9"]
                | ["a"-"f"]
                | ["A"-"F"] >
}

TOKEN [IGNORE_CASE]: {
  <POWERCmd : "POWERCMD" >
  | <RECORDCmd : "RECORDCMD" >
  | <TEST1Cmd : "TEST1CMD" >
  | <TEST2Cmd : "TEST2CMD" >
  | <TEST3Cmd : "TEST3CMD" >
  | <TEST4Cmd : "TEST4CMD" >
}

TOKEN: {
  <STRINGARG: (<ALPHANUM>)+ >
  | <#ALPHANUM: ["0" - "9"]
                | ["a" - "z"]
                | ["A" - "Z"]
                | "@"
                | "."
                | "_" >
}
```

Fig. 6B

```
| TOKEN: {
| <EOL:"\n">
} int one_command_section():
{}
{
    COMMAND_element (){
        startOver=false;
        ARG_STRINGs=new String [argStack.size()];
        for (int i=0; i<argStack.size(); i++){
            ARG_STRINGs[i] = (String)argStack.pop();
            System.out.println("-------> COMMAND token ["+cmdC+"]; + ARG_STRINGs[i]);
            cmdC++;
        }
        System.out.flush();
        startOver=true;
        return 1;
    }
    | GUID_element() {
        startOver=false;
        ARG_STRINGs=new String [argStack.size()];
        for (int i=0; i<argStack.size(); i++){
            ARG_STRINGs[i] = (String)argStack.pop();
            System.out.println("-------> GUID token ["+guidC+"]; + ARG_STRINGs[i]);
            guidC++;
        }
        System.out.flush();
        startOver=true;
        return 1;
    }
}
```

Fig. 7 GRAMMAR RILE TO DEFINE COMMAND SYNTAX (CONT'D)

```
| STRINGARG_element()    {
            startOver=false;
            ARG_STRINGs=new String [argStack.size()];
            for (int i=0; i<argStack.size(); i++) {
                ARG_STRINGs[i] = (String)argStack.pop();
                System.out.println("———> STRINGARGs token ["+ stringC+"]: "+ARGSTRINGs[i]);
                stringC++;
            }
            System.out.flush();
            startOver=true;
            return 1;
        }
| <EOF> {
            System.out.println("<EOFile>detected, Exciting!............");
            return0;
        }
| <EOL> {
            System.out.println("<EOLine>detected!............");
            cmdC=0; guideC=0; stringC=0;
            return-1;
        }
}
voidSTRINGARG_element():
{}
{
    <STRINGARG>{ argStack.push( new String(token.image) )(; }
}
voidGUID_element():
{}
{
    <GUID>{ argStack.push( new String(token.image) )(; }
}
voidCOMMAND_element():
{}
{
    <POWERCmd> { argStack.push( new String(token.image) ); }
  | <RECORDCmd> { argStack.push( new String(token.image) ); }
  | <TEST1Cmd> { argStack.push( new String(token.image) ); }
  | <TEST2Cmd> { argStack.push( new String(token.image) ); }
// | <TEST3Cmd> { argStack.push( new String(token.image) ); }
// | <TEST4Cmd> { argStack.push( new String(token.image) ); }
}
voidEOL_element():
{}
{
    <EOL>
}
```

Fig. 8 BNF EQUIVALENCE OF JAVACC's GRAMMAR FILE ILLUSTRATED IN FIG. 4
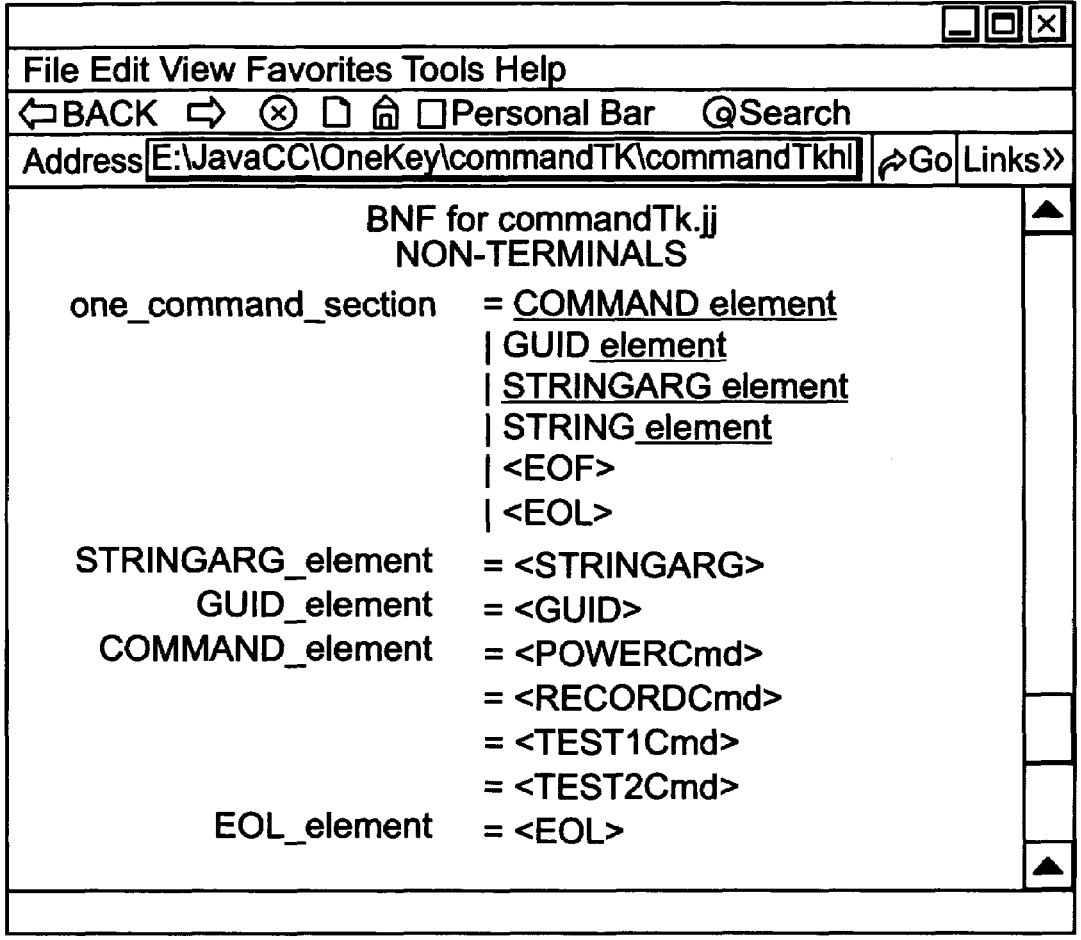
Fig. 9   TEXT-BASED COMMAND TEST INPUT FILE
```
POWERCMD  0xAA000001-4fff8000   0x00BC00ee-375e0003   0xB000C000-feab4000
hfang@sharplabs.com credit information 89-34-0023-0277 h.fang.windows2000
test1cmd POWERcmd reCORDCmd    test2CmdTEST@CMD
test2CMD RECORDCmd  TEST1CMD   tEsT1CmD
ReCorDCMD  0x123456789-87654321  0X23423423-45645678  0xfefeabab-00110022  0x87654321-12345678
```

Fig. 10
COMMANDTK TOKEN GENERATOR OUTPUT FILE

```
Enter a command, (0-9, a-z, '-, @, .' only):
--------> COMMAND token [0]: POWERCMD
--------> GUID token [0]: 0xAA000001-4fff8000
--------> GUID token [1]: 0x00BC00EE-375e0003
--------> GUID token [2]: 0xB000C000-feab4000
--------> STRINGARGs token [0]: hfang@sharplabs.com
--------> STRINGARGs token [1]: credit
--------> STRINGARGs token [2]: information
--------> STRINGARGs token [3]: 89-34-0023-0277
--------> STRINGARGs token [4]: h.fang.windows2000
--------> COMMAND token [1]: test1cmd
--------> COMMAND token [2]: POWERcmd
--------> COMMAND token [3]: reCORDCmd
--------> COMMAND token [4]: test2Cmd
--------> STRINGARGs token [5]: TEST@CMD
--------> COMMAND token [5]: test2Cmd
--------> COMMAND token [6]: RECORDCmd
--------> COMMAND token [7]: TEST1CMD
--------> COMMAND token [8]: tEsT1CmD
--------> COMMAND token [9]: ReCorDCMD
--------> STRINGARGs token [6]: 0x123456789-87654321
--------> GUID token [3]: 0x23423423-45645678
--------> GUID token [4]: 0xfefeabab-00110022
--------> GUID token [5]: 0x87654321-12345678
<EOLine> detected!..........
Enter a command, (0-9, a-z, '-, @, .' only):
<EOFile> detected , Exciting!..........
```

Fig. 13
STRING EDITING DIALOG

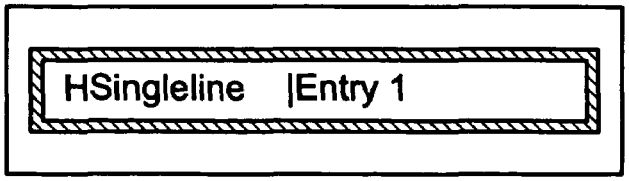

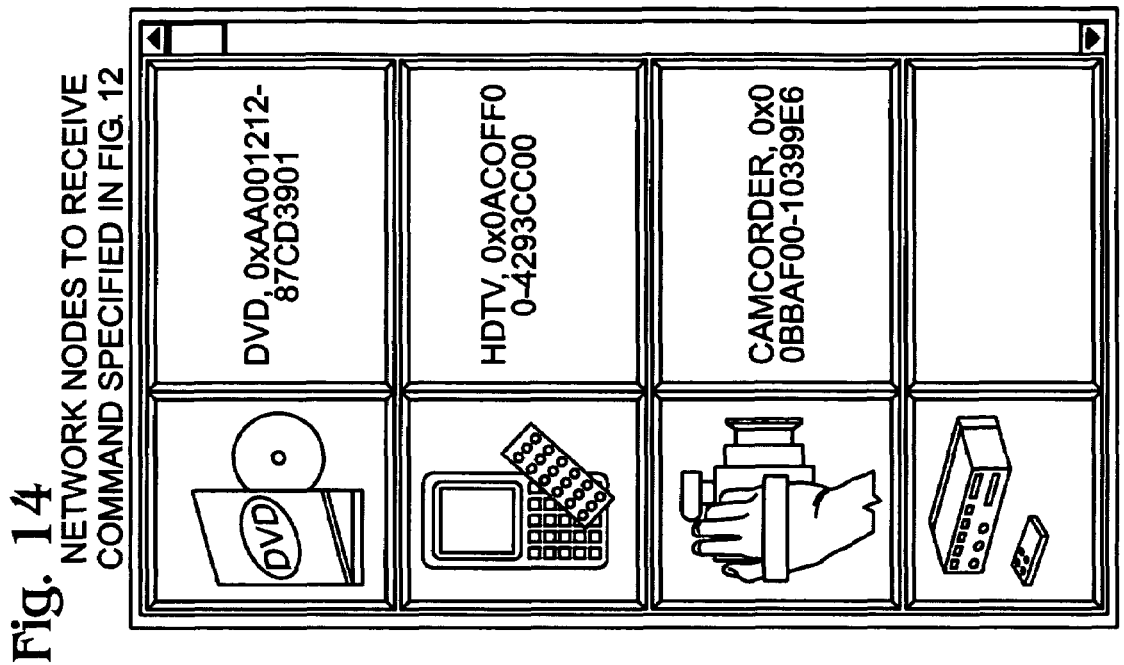
Fig. 14 NETWORK NODES TO RECEIVE COMMAND SPECIFIED IN FIG. 12
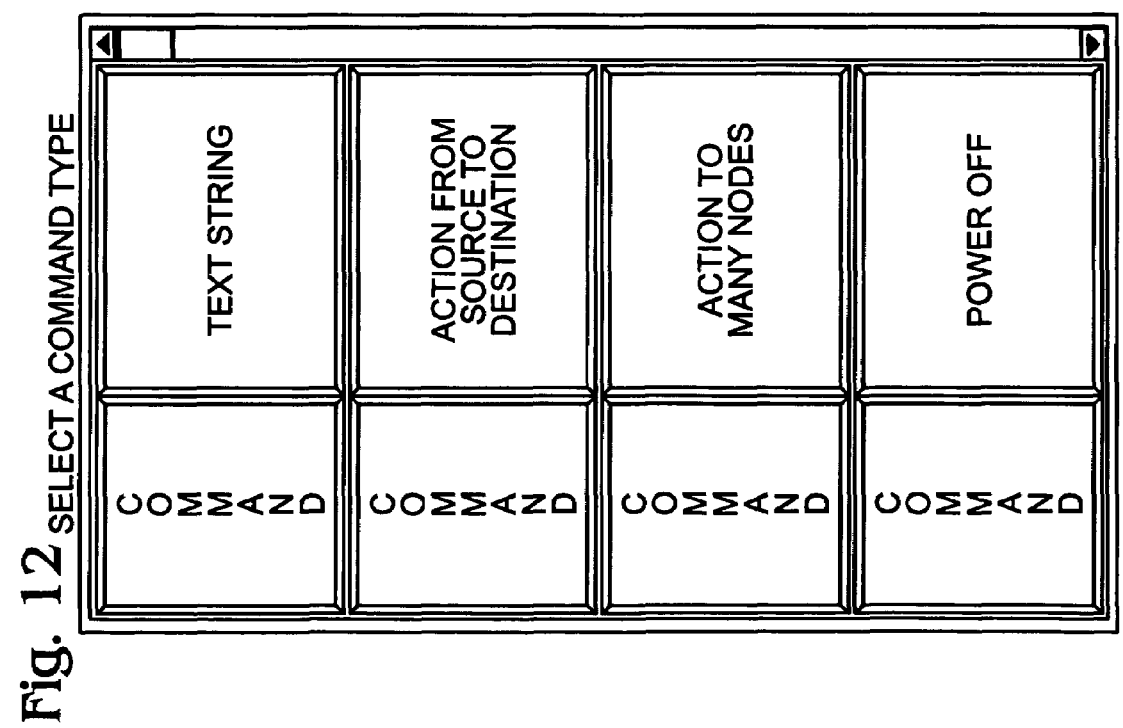
Fig. 12 SELECT A COMMAND TYPE

SYSTEM AND METHOD FOR ONE-STROKE MULTIMEDIA PROGRAMMING

BACKGROUND OF THE INVENTION

1. Field of the Invention

This invention generally relates to HAVi consumer electronics and, more particularly, to a method for programming and invoking command sequences in a HAVi electronics device using a single keystroke on a remote control device.

2. Description of the Related Art

There are many situation in which a user would prefer to complete a series of HAVi (Home Audio/Video Interoperability) network operations using a single keystroke of a remote control device. For example, to enter a user name, password, credit card number, or to setup a video recording to transfer family video from DCamcorder to DVHS. Conventionally, a series of operations, or multiple keystrokes must be performed to enact such operations.

Conventionally, the keys on a remote control will only issue one code to an application. The system and applications perform fixed commands previously configured by the manufacturer according to the input key code. Keys such as FastFwd (FF), Rewind (REW), Play (PLAY), numeric keys, etc. are fixed function keys. When pressing FF, a user expects to fast forward a stored tape device, for example. Pressing numeric keys, a user may expect to change a channel or enter bank account numbers.

As the HAVi specification is introduced, it is not possible to define remote controller function keys that will work the same way with every manufacturer for the following reasons:

Virtual keyboard and software panel bring users to different interaction metaphors;
Unpredictable user-established HAVi commands make the remote control (RC) design complicated;
Undefined user preferences for HAVi network device control.

Programmable RC keys would not only reduce factory costs, but would also offer compelling features. However, adding a programmable function to a remote control would require a more complicated remote that required higher computation power, more memory, and an program interface.

It would be advantageous if the keys of a conventional RC device could be made programmable to control a HAVi device.

SUMMARY OF THE INVENTION

The present invention describes a programmable RC key that send only one type of RC key code to the receiver regardless how the key is programmed. As a result, the programmable key feature has no impact to any of the HAVi-related applications. Events are delivered to the registered event handler after an RC key is pressed, and the application's event handler has two options.

The application may use its programming logic and current programming state to interact with the user's RC input. This is how a conventional application interacts with a user. Pre-defined input event sets must appear at certain logic states. For example, a RED color key is pressed on the RC at a time when the application is looking for either a RED, BLUE, or GREEN key input. The RED key input drives the application to a new dialog or action. If the RED color is pressed during any other time, the application does not respond.

Alternately, the application interrogates a HEventRepresentation extension whenever a RC event is received. Event interrogation, by the application, results in user-defined commands. If interrogation of HEventRepresentation is not performed by the application, the RC event still can be received as a key event, as described above. For example, the application can receive a RED key event at any time. If the application is looking for a RED key event, the response is driven by the application logic. For example, a pre-defined command set can be retrieved.

Accordingly, a method is provided for configuring command sequences from a remote control (RC) keystroke in a multimedia system of networked devices. The method comprises: selecting a multimedia configuration menu; selecting an RC key; selecting a multimedia command to associate with the RC key; selecting a multimedia source associated with the multimedia command; selecting a multimedia destination associated with the multimedia command; in response to associating multimedia commands with RC keys, generating an RC key map cross-referencing RC keys to multimedia commands; and, storing the RC key map in permanent memory.

A method is also provided for generating command sequences from a RC keystroke in a multimedia system of networked devices. The method comprises: selecting a programmed RC key; accessing a map of RC keys and multimedia commands; parsing the map by RC key; reading the command associated with the selected RC key; and, performing a sequence of multimedia functions in response to the command.

Additional details of the above-described methods are presented below.

BRIEF DESCRIPTION OF THE DRAWINGS

FIG. 1 is a flowchart illustrating the present invention method for configuring command sequences from a remote control (RC) keystroke in a multimedia system of networked devices.

FIG. 2 is a flowchart illustrating the present invention method for generating command sequences from a RC keystroke in a multimedia system of networked devices.

FIG. 3 illustrates the present invention extended HEventRepresentation table usage.

FIGS. 4A and 4B illustrate the present invention process data flow.

FIGS. 5A through 7 illustrate a set of simplified command-line language syntax for one-push-multiple-function-done application.

FIG. 8 illustrates the BNF equivalence of those nonterminal tokens defined in FIGS. 5A through 7.

FIG. 9 illustrates a simple text-based test input file that is used as the test input of commandTk token generator.

FIG. 10 illustrates the output of the "java-cp. commandTk <testInput1.txt>a.out" command.

FIGS. 11 through 14 are drawings illustrating a user interface (UI).

DETAILED DESCRIPTION OF THE PREFERRED EMBODIMENTS

FIG. 1 is a flowchart illustrating the present invention method for configuring command sequences from a remote control (RC) keystroke in a multimedia system of networked devices. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 100.

Step 102 selects a multimedia configuration menu. Step 104 selects an RC key. Step 106 selects a multimedia command to associate with the RC key. Step 108 selects a multimedia source associated with the multimedia command. Step 110 selects a multimedia destination associated with the multimedia command. Step 112, in response to associating multimedia commands with RC keys, generates an RC key map cross-referencing RC keys to multimedia commands. Step 114 stores the RC key map in permanent memory.

In some aspects of the method, selecting a multimedia command to associate with the RC key in Step 106 includes a command selected from the group including copying content from a broadcast source to the destination, duplicating content from the source to the destination, duplicating content from the source to a plurality of destinations, playing content from the source, selecting a screen to view content, creating a text string to be added to content, creating a distribution command, such as simultaneously powering on a plurality of network devices, configuring multiple functions associated with each RC key, or tuning a channel based on an Electronic Program Guide (EPG) selection. EPG is a set of TV program data that is broadcast. It can be received and stored in a TV. EPG data includes program title, classification, program begin/end times, language, close caption information, channel number, and/or subchannel number to name a few examples.

In other aspects, selecting a multimedia command to associate with the RC key includes substeps. Step 106a creates a plurality of configuration directories. Step 106b, for each directory, selects multimedia commands to associate with RC keys.

Selecting a multimedia configuration menu in Step 102 may include substeps. Step 102a triggers a home audio-visual interoperability (HAVi) L2 graphical user interface (GUI) event model. Step 102b engages a HAVi event handler. Step 102c displays a configuration interface on a screen. Then, selecting a multimedia command to associate with the RC key in Step 106 includes using the on-screen configuration interface to associate commands with RC keys.

In other aspects, selecting an RC key in Step 104 includes selecting a key from the group including alpha-numeric, color, and icon keys. Alternately stated, any of the keys on the RC can be selected.

Other aspects of the method include further steps. Step 116, following the configuration of the RC key, selects the programmed RC key. Step 118 accesses a map of RC keys and multimedia commands. Step 120 parses the map by RC key. Step 122 reads the command associated with the selected RC key. Step 124 performs a sequence of multimedia functions in response to the command.

FIG. 2 is a flowchart illustrating the present invention method for generating command sequences from a RC keystroke in a multimedia system of networked devices. The method starts at Step 200. Step 202 selects a programmed RC key. Selecting an RC key in Step 202 may include selecting a key from the group including alpha-numeric, color, and icon keys. Step 204 accesses a map of RC keys and multimedia commands. Step 206 parses the map by RC key. Step 208 reads the command associated with the selected RC key. Step 210 performs a sequence of multimedia functions in response to the command.

In some aspects, parsing the map in Step 206 includes building a table of RC keys cross-referenced to commands. Accessing a map of RC keys and multimedia commands in Step 204 may include accessing a map of RC keys, multimedia commands, and multimedia sources. Then, building a table of RC keys cross-referenced to commands includes cross-referencing the RC keys to multimedia sources.

In other aspects, Step 204 accesses a map of RC keys, multimedia commands, multimedia sources, and multimedia destinations. Then, Step 206 builds a table of RC keys cross-referenced to commands by cross-referencing the RC keys to multimedia destinations. In different aspects, building a table of RC keys cross-referenced to commands includes saving the table of RC keys cross-referenced to commands in temporary memory.

In some aspects, performing a sequence of multimedia functions in response to the command in Step 210 includes performing commands selected from the group including copying content from a broadcast source to the destination, duplicating content from the source to the destination, duplicating content from the source to a plurality of destinations, playing content from the source, selecting a screen to view content, creating a text string to be added to content, creating a distribution command such as simultaneously powering on a plurality of network devices, configuring multiple functions associated with each RC key, and tuning a channel based on an Electronic Program Guide selection.

In different aspects, selecting a programmed RC key in Step 202 includes substeps. Step 202a triggers a home audio-visual interoperability (HAVi) L2 graphical user interface (GUI) event model. Step 202b engages a HAVi event handler. Then, parsing the map by RC key in Step 206 includes using a syntax parser program written in the JAVA language to parse the map in response to input from the HAVi event handler. Performing a sequence of multimedia functions in response to the command in Step 210 includes generating HAVi commands structured in IEEE-1394 protocols.

In other aspects of the method, Step 203 selects a directory. Then, accessing a map of RC keys and multimedia commands in step 204 includes accessing a map of RC keys and multimedia commands distinguished by directory. Reading the command associated with the selected RC key in Step 208 includes substeps. Step 208a finds the directory. Step 208b reads the command associated with the selected RC key, from the found directory.

This invention has application to the HEventRepresentation class defined by HAVi L2 specification, so that an application is able to determine if an RC key has user-defined function. If it has, an ASCII text-based key definition can be analyzed by a parser generator for further interpretation into HAVi commands. This invention also suggests a systematic and automatic procedure from syntax definition, to parser generation.

The present invention uniquely nests in a HAVi L2 GUI API system by extending the L2 GUI API. The present invention method uses JAVA tools (i.e., javaCC) to create a parser generator in JAVA. These high-level tools define a new language syntax, that automatically generates a low maintenance code.

The L2 GUI API provides a mechanism to retrieve key representation data defined by HAVi specification. The same retrieval mechanism can be used to acquire additional data representations, as described below. As far as key representation updates are concerned, it is implementation specific. Specific storage update implementations do not break the representation retrieval specification.

A user interface is used to configure, store, retrieve, and interrogate the one-push-multiple-function-done key representations using L2 GUI API extension. A proprietary syntax of data representation is defined with a user-defined function key (or one-push-multiple-function-done key). JAVA code is generated that recognizes the proprietary syntax of data representation.

The syntax of the one-push-multiple-function-done key representation can be categorized into four different syntax formats based on four different kinds of multiple function characteristics. The four categories of function are:

To represent multiple keyboard inputs. A collection of Remote Control (RC) keys can be configures, for instance, a string of account numbers, such as 36-2453-611, or an email address;

To represent an application command over several target devices. The application commands are pre-defined operations. The target devices are identified by GUID (Global Unique Identifier), such as [PowerOffCmd] 0xAA000000-5f004a31(a DVHS's GUID), 0x00C03000-AA003545 (a Stereo's GUID), 0x00710000-B4001121(a PVR).

To represent an application command over one source device and one target device. The application commands are pre-defined operations. These kinds of operations usually issue one function to a source device and another function to a target device, such as [VideoRecordCmd] from DTV to DVHS.

To represent a collection of application commands. This category of syntax is a similar to the three above-mentioned types of command syntax. The syntax format could combine a series of operations that the user wishes to complete with one keystroke. For example, a user may wish to program a key to:

invoke an email composer;

move a cursor to the 'TO' field; and, create a text string that represents an addressee's email address.

Therefore, every time when the programmed key is pressed, email composer application is open, and the "TO" field is automatically populated with the specified email address.

The HEventRepresentation class is defined in HAVi L2 GUI specification. It stores the text, symbol and color representation of a key event. There are different ways of storing the HEventRepresentation table contents as described in an abandoned application entitled, SYSTEM AND METHOD FOR MANIPULATING HAVi SPECIFICATION VIRTUAL KEY DATA, invented by Henry Fang, Ser. No. 09/944,685, Filing date Aug. 31, 2001, assigned to the same assignee as the present invention, which is incorporated herein by reference.

The present invention method extends the HEventRepresentation class specification to store user-defined commands as additional representation data that is not specified in HAVi L2 GUI specification.

The next section describes the following:

Interacting software modules and layers;

an overall process flow to support the HEventRepresentation table extension, such as how syntax of a new language is defined, how to configure the HEventRepresentation table and its extension, and how user commands are mapped into HAVi commands;

Extended Interface design of the HEventRepresentation class to access the command field for each table entry;

A simple example to demonstrate a systematical approach to maintain a Java parser generator, so that new command syntax can be expanded as application requirements are changed; and, a recommended user interface to configure the HEventRepresentation table and extension.

Software Modules and Layers

If the table of HEventRepresentation is made programmable and there is one additional field for each table entry, then this additional field in HEventRepresentation (i.e., Command field) can be used to store command information in the format that matches the syntax grammar defined by the grammar file.

FIG. 3 illustrates the present invention extended HEventRepresentation table usage. Shown are software layers in a L2 GUI based system. A typical software interaction among software modules, as shown in this example, is triggered by a remote control input, when users press a key on a remote controller.

When a key code is received by the remote control driver, a corresponding HAVi event is generated by L2 GUI event model module. This key event calls the HAVi event handler in the application layer. One action performed by the application handler may be to figure out what the key event represents. This action is performed by calling the L2 GUI HEventRepresentation for that key event. HEventRepresentation returns the user command content to application and a token is parsed out by user command parser generator module. The parsed user command(s) can then be translated into HAVi commands for each HAVi device on the network, by using the HAVi command mapping module.

Overall Process Flow

The overall process required to configure the user command in HEventRepresentation is presented, to define and specify the user command language grammar, to parse command into tokens, and to re-map user command into HAVi commands to control nodes on the 1394 bus.

FIGS. 4A and 4B illustrate the present invention process data flow. This process is further divided into four categories, as shown. They are: compile-time process, run-time process, application maps user command syntax to HAVi commands process, and 1394 physical layer process.

The compile-time process part of the figure shows the flow from preparing a user command grammar file to parser generator byte-code. The run-time process part of the figure shows the flow of how a user configures user commands and how a user command parser generator parses the user command into tokens. The application mapping process part of the figure shows that the application interprets the tokens and re-maps those parsed tokens into HAVi commands. The 1394 physical layer process translates the HAVi commands into bus protocol data for transmission.

Interface Required to Support the Extended User Command Table

To use HEventRepresentation class to store multiple function key data, the following class, class methods, and representation syntax are elaborated as follows.

--- i. Cass hierarchy
   java.lang.Object
   |
   +–org.havi.ui.event.HEventRepresentation
   |
   +–org.havi.ui.event.HSharpEventRepresentation

--- ii. Methods in HSharpEventRepresentation class In org.havi.ui.event.HsharpEventRepresentation class, add the following methods:

public boolean isKeyUserDefined(int keyCode);

This function returns TRUE if system has stored a user-defined operation corresponding to keyCode argument. It returns FALSE, if there is none.

public void setUserDefinedKeyStatus(boolean defined, int heyCode);

This method sets the internal value read by public boolean isKeyUserDefined(int keyCode) method. Usually, this method will not be used until the following method public void setOperationDefinition(int keyCode, byte[ ] ops); is called.

public void setOperationDefinition(int heyCode, byte[ ] ops);

This method has two arguments. KeyCode is the identification of ops in the storage. Ops is the byte array user defines operations corresponding to the keyCode. The syntax of operations that user defines is described in section (3), Multiple function representation syntax. This method stores user-defined operation in the storage identified by keyCode.

public byte[ ] getOperationDefinition(int keyCode);

This method retrieves operation byte array stored with the following method public void setOperationDefinition(int keyCode, byte[ ] ops);.

The argument keyCode is used to identify the storage.

iii. Multiple function representation syntax

To specify the precise syntax of a new language, small or huge, it is usually described in BNF (Backus Naur Form) in the industry. The XML Document Type Definition (DTD) form is certainly another high-level language description tool.

A Simple Parser Generator Example

FIGS. 5A through 7 illustrate a set of simplified command-line language syntax for one-push-multiple-function-done application. Based upon the assumption that the application needs to represent three categories of command syntax, the grammar file of JavaCC can be written as shown in FIGS. 5A through 7. The grammar defines the following:

i. The JavaCC output files should be stored in directory E:\\JavaCC\\OneKey\\output\\commandTk ii. The output files have file root name commandTk, such as
commandTk.java
commandTkTokenManager.java
commandTkConstants.java
commandTkParseException.java iii. Token <STRINGARG> is any combination of ASCII text "a–z", "@", ".", and "–"

iv. Token <GUID> is in the form of 0x followed by 8 hex digits v. Token <POWERCMD>, <RECORDCMD>, <TEST1CMD>, and <TEST2CMD> is consisted on case insensitive string "powercmd", "recordcmd", "test1cmd", and "test2 cmd"

vi. Process ends if <EOF> (end of file code, or ˆ C) is received vii. Track numbers of command tokens, <GUID> tokens, <STRINGARG> tokens within a logical line (between two [CarriageReturn]'s), and parse them out and print those token in standard IO device, I.e., monitor display.

FIG. 8 illustrates the BNF equivalence of those non-terminal tokens defined in FIGS. 5A through 7. The file contents illustrated in FIG. 8 is an JJDoc utility output.

FIG. 9 illustrates a simple text-based test input file that is used as the test input of commandTk token generator.

FIG. 10 illustrates the output of the "java -cp . commandTk <testInput1.txt>a.out" command.

User Interface to Configure the User Command Field of HEventRepresentation

FIGS. 11 through 14 are drawings illustrating a user interface (UI). The UI design of the user command configuration depends on the contents of user commands. In the simple parser generator example above, the UI design could use L2 GUI HListGroup single selection and multiple selection options, and HsinglelineEntry components to accomplish the user interactions. The user interface design of the configuration is a program, which is briefly described with the following steps:

Step 1. User selects a key to be programmed (for instance, RED key, BLUE key, YELLOW key, GREEN key). In FIG. 11, the "Blue Button" element has been selected by user.

Step 2. User decides to configure the BLUE key with one of four command types.

Step 3. If user selects "Text String" button, then a Text String type of command is configured to the BLUE key. A text editing area appears to program the string into the key as shown in FIG. 13.

Step 4. If user selects "ACTION to many nodes" button, a different user interface is required to prompt user to select an objective nodes as shown in FIG. 14. Each element in FIG. 14 indicates a HAVi network node (or a device). The user may select multiple nodes to receive a command ACTION. In FIG. 14, a DVD with GUID 0xAA001212-87CD3901 is selected to receive command ACTON. A CAMCORDER with GUID 0x00BBAF00-1039E6 is also selected to receive command ACTION.

The user interface in Step 1 above can be implemented with a HAVi L2 GUI component HListGroup in single selection mode. The user interface in Step 2 above can be implemented with anther HAVi L2 GUI component HListGroup in single selection mode that contains user commands including StringCmd, PowerOffCmd, RecordCmd as described above. The user interface in Step 3 above can be implemented with a HAVi L2 GUI component HSinglelineEntry. The user interface in Step 4 can be implemented with a HAVi L2 GUI component HListGroup in multiple selection mode.

Methods have been provided for configuring and invoking command sequences from a remote control (RC) keystroke in a multimedia system of networked devices. This invention process can be used as a: systematic approach to design a set of user command language recognized by a plurality of devices; an approach to configure/reconfigure RC key representations independent of applications; a process that takes advantage of JAVA language (requirement for L2 GUI) and HEventRepresentation class's extension for data storage. Although the invention has been specifically described in the context of a HAVi system, it has wider application. Other variations and embodiments of the invention will occur to those skilled in the art.

I claim:

1. In a multimedia system of networked devices, a method for generating command sequences from a remote control (RC) keystroke, the method comprising:

selecting a programmed RC key;

accessing a map of RC keys, multimedia sources, multimedia destinations, and multimedia commands;

parsing the map by RC key, building a table of RC keys cross-referenced to commands for multimedia sources and multimedia destinations;

reading the command associated with the selected RC key;

performing a sequence of multimedia functions in response to the command;

wherein selecting a programmed RC key includes:

triggering a home audio-visual interoperability (HAVi) L2 graphical user interface (GUI) event model;

engaging a HAVi event handler; and, wherein parsing the map by RC key includes using a syntax parser program written in the JAVA language to parse the map in response to input from the HAVi event handler; and, wherein performing a sequence of multimedia functions in response to the command includes generating HAVi commands structured in IEEE-1394 protocols.

2. The method of claim 1 wherein building a table of RC keys cross-referenced to commands includes saving the table of RC keys cross-referenced to commands in temporary memory.

3. The method of claim 1 wherein performing a sequence of multimedia functions in response to the command includes performing commands selected from the group including copying content from a broadcast source to the destination, duplicating content from the source to the destination, duplicating content from the source to a plurality of destinations, playing content from the source, selecting a screen to view content, creating a text string to be added to content, creating a distribution command, such as simultaneously powering on a plurality of network devices, configuring multiple functions associated with each RC key, and tuning a channel based on an Electronic Program Guide selection.

4. The method of claim 1 wherein selecting an RC key includes selecting a key from the group including alphanumeric, color, and icon keys.

5. The method of claim 1 further comprising:

selecting a directory; and, wherein accessing a map of RC keys and multimedia commands includes accessing a map of RC keys and multimedia commands distinguished by directory;

wherein reading the command associated with the selected RC key includes:

finding the directory; and, reading the command associated with the selected RC key, from the found directory.

* * * * *